United States Patent [19]
Sutherland

[11] 3,803,033
[45] Apr. 9, 1974

[54] PROCESS FOR REMOVAL OF ORGANIC CONTAMINANTS FROM A FLUID STREAM

[75] Inventor: Gordon Sutherland, Wilmington, Del.

[73] Assignee: AWT Systems, Inc.,, Wilmington, Del.

[22] Filed: Nov. 6, 1972

[21] Appl. No.: 303,835

Related U.S. Application Data
[63] Continuation-in-part of Ser. No. 207,547, Dec. 13, 1971.

[52] U.S. Cl..................................... 210/40, 210/59
[51] Int. Cl.............................................. C02c 5/02
[58] Field of Search ........... 210/39, 40, 41, 42, 506, 210/509, 222, 223, 502, 54; 252/447, 62.63, 62.56; 131/10.7

[56] References Cited
UNITED STATES PATENTS

| | | | |
|---|---|---|---|
| 3,441,502 | 4/1969 | Tenorio | 210/49 |
| 3,549,527 | 12/1970 | Peck et al. | 210/54 |
| 3,251,365 | 5/1966 | Keith et al. | 131/10.7 |
| 3,539,509 | 11/1970 | Heitmann et al. | 210/42 |
| 3,657,119 | 4/1972 | Turbeville | 210/40 X |
| 2,479,930 | 8/1949 | Herkenhoff et al. | 252/447 X |

Primary Examiner—Charles N. Hart
Assistant Examiner—Benoit Castel
Attorney, Agent, or Firm—Finnegan, Henderson, Farabow & Garrett

[57] ABSTRACT

A process for the removal of organic contaminants from a fluid stream containing organic contaminants. The process involves dispersing a magnetically susceptible iron-carbon complex in the fluid stream, maintaining the magnetically susceptible iron-carbon complex in a dispersed condition until a substantial amount of contaminants have been adsorbed from the fluid stream, and passing the magnetically susceptible iron-carbon complex containing dispersion through a magnetic filter to separate the dispersion into a fluid stream having a reduced concentration of contaminants and an adsorbed complex containing contaminants. Regeneration of the adsorbed complex may be accomplished by heating the complex in an inert atmosphere at a temperature sufficient to desorb and vaporize the contaminants.

2 Claims, 1 Drawing Figure

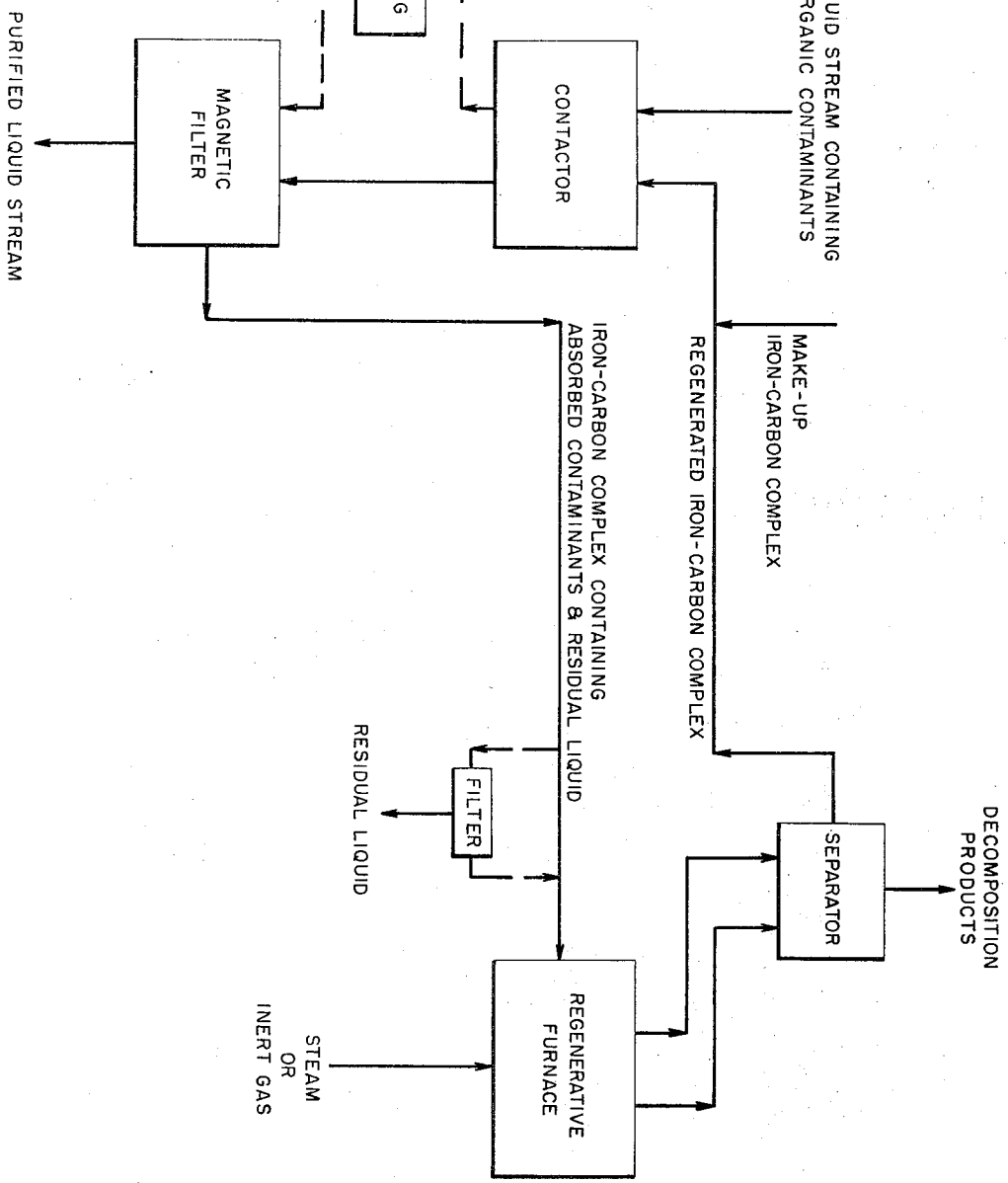

PROCESS FOR REMOVAL OF ORGANIC CONTAMINANTS FROM A FLUID STREAM

CROSS REFERENCE TO RELATED APPLICATION

The present application is a continuation-in-part of copending application Ser. No. 207,547, filed Dec. 13, 1971.

FIELD OF THE INVENTION

This invention relates to a process for removing contaminants from fluids using a magnetically susceptible iron-carbon complex to adsorb said contaminants with subsequent separation of contaminant containing iron-complex from the fluid. In another aspect, this invention relates to a process for regeneration of magnetically susceptible iron-carbon complex which has adsorbed contaminants from a fluid stream.

BACKGROUND OF THE INVENTION

Powdered activated carbon has been in use for many years for the treatment of water and other liquids containing contaminants to reduce the concentration of contaminants therein. Activated carbon in powder form is particularly desirable for use in water systems because the carbon particles with adsorb about 90 percent of their total adsorptive capacity in less than 5 minutes. The principal disadvantages in using powdered carbon for removing contaminants from liquids has been due to losses of the powdered carbon either during processing or during regeneration of the carbon to remove contaminants therefrom. An additional problem encountered with use of powdered carbon as an adsorbent in liquid systems has been the long settling times required to recover the carbon. These long settling times required to recover the carbon have necessitated large retention tanks in order to permit complete removal of the carbon from the water and recovery of the powdered carbon.

Various techniques have been used to reduce the time required for settling of powdered carbon after treatment of a liquid system to remove impurities. In one such technique a flocculating agent is used with the carbon. In another technique weighting agents of magnetite or clay have been added with carbon to contaminated water to increase the rate of settling. It has been found necessary, even when weighting agents have been employed, to include flocculating agents to achieve settling of the powdered carbon within a reasonable time.

In my copending patent application Ser. No. 207,547, a magnetically susceptible iron-carbon complex and a method for preparation of said iron-carbon complex are completely disclosed. Reference to said copending application is hereby made. The iron-carbon complex described in said copending application comprises a heterogeneous cluster of powdered activated carbon having particles of iron-oxide intermingling and adhering to the powdered activated carbon, said iron-oxide principally comprising $Fe_3O_4$. This magnetically susceptible iron-carbon complex, sometimes referred to hereinafter as complex, may be readily removed from fluid streams by magnetic means.

SUMMARY OF THE INVENTION

In accordance with this invention, a process is provided for removal of organic contaminants from a fluid stream employing the magnetically susceptible iron-carbon complex heretofore briefly described, said process comprising:

a. dispersing magnetically susceptible iron-carbon complex in said fluid feed stream, b. maintaining said magnetically susceptible iron-carbon complex in dispersed condition throughout said fluid feed stream until the adsorptive capacity of the complex is substantially reduced as a result of adsorption of contaminants from said fluid, c. passing the dispersion of step (b) through a magnetic filter in which said dispersion is subjected to a magnetic field whereby the dispersion is separated into (1) a fluid stream having a reduced concentration of contaminants and (2) complex containing adsorbed contaminants, d. regenerating the separated complex from step (c) by heating said complex in an inert atmosphere, and at a temperature sufficient to desorb contaminants, from the complex and vaporize said contaminants, and maintaining said heat and atmosphere conditions until desorption is substantially complete, and e. recovering regenerated complex.

DETAILED DESCRIPTION OF THE INVENTION

The fluid streams containing organic contaminants which can be treated in accordance with the process of this invention include both gas and liquid stream of any composition that contain organic contaminants which can be adsorbed by activated carbon. The process is particularly suitable for removal of soluble or dispersed organic materials from water. The process of this invention is suitable for treating aqueous streams which contain contaminants such as insecticides, detergents, phenols, dyes, enzymes, viruses, fats, proteins, polysaccharides, oils, colloids, odor or color producing organic compounds and the like. The process is particularly useful for tertiary treatment of industrial or sanitary sewage to make such liquid streams acceptable for disposal in rivers. Non-aqueous streams can also be treated in accordance with this invention. Illustrative non-aqueous streams which can be treated include liquid synthetic organic resins containing color bodies as impurities, dry cleaning agents, glycerin containing both color and odor producing organic contaminants, and the like.

Examples of gas streams that can be treated in accordance with this invention include air containing contaminants such as organic gases or finely divided organic particles. The process of the present invention can also be used to remove various organic contaminants from hydrocarbon gas streams.

The iron-carbon complex employed in the process of the present invention is mechanically strong. The complex can be suspended in water and when the complex is subjected to a magnetic field the entire complex, carbon as well as the iron oxide, is substantially completely removed from suspension. The complex can withstand mechanical agitation as a dry material, even at elevated temperatures.

The iron-carbon complex was examined by electron microscopy for purposes of comparison of the complex with physical mixtures of iron oxide ($Fe_3O_4$) prepared from $FeSO_4$ and carbon powder. In the physical mixtures of carbon powder and iron oxide particles, the individual particles of both materials were readily recognized by electron microscopy. In contrast, the iron-carbon complexes of this invention appeared as heterogeneous clusters. Very thin sections of a cluster were examined. These thin clusters permitted formation of an image using the electron microscope which showed the iron oxide particles to have the shape of polygonal coins randomly distributed in the powdered carbon particles.

The magnetically susceptible iron-carbon complex employed in the process of the present invention may be prepared by a process comprising the steps of: (a) forming a slurry by admixing powdered activated carbon, a ferrous salt solution and a sufficient amount of a base reagent to control the resulting slurry to a pH level of from about 6 to about 11, said slurry having a continuous phase comprising ferrous salt solution and the base reagent and a dispersed phase comprising powdered activated carbon, and (b) mixing the slurry of step (a) in the presence of air for a time and at a temperature sufficient to form a slurry having a continuous phase comprising a ferrous salt solution of reduced concentration and base reagent, and a dispersed phase comprising particles of the iron-carbon complex, said heating being continued until substantially all of particles of the iron-carbon complex can be moved in response to application of a magnetic field to said particles. The iron-carbon complex can be separated from the slurry quickly by application of a magnetic field to the slurry to hold the particles, and decanting the liquid phase from the iron-complex particles. The complex can also be separated by filtration methods. The resultant iron-carbon complex particles are dried and stored for use as required.

The carbon which can be employed in the iron-carbon complex includes all types of activated carbon in particulate form having particles ranging from about 200 angstroms up to about 200 microns in their greatest dimension. The term "activated" carbon means a porous carbon having adsorptive capacity and derived from organic substances of vegetable origin such as lignite, and wood pulp by-products, and animal or carbonaceous mineral origin.

Any ferrous salt which can be precipitated by the addition of a base reagent to an aqueous solution of the ferrous salt can be employed to prepare the complex.

Illustrative ferrous salts which can be employed include ferrous sulfate, ferrous chloride, ferrous acetate, ferrous bromide, ferrous nitrate, and the like.

Illustrative base reagents which can be employed to adjust the pH of the slurry include sodium hydroxide, potassium hydroxide, ammonium hydroxide, ammonium carbonate, calcium oxide, and the like. Adjustment of the pH of the slurry in preparing the iron-carbon complex is important to insure precipitation of the ferrous hydroxide and to prepare an iron-carbon complex that exhibits sufficient magnetic susceptibility to be attracted by magnetic forces. Thus, it has generally been found that iron-carbon complexes prepared in slurries in which the pH is less than about 6, or greater than about 11, have very poor magnetic properties. It is generally desirable to maintain the slurry at a pH of between about 6 and 11, and preferably between about 7 to about 9 to achieve an iron-carbon complex having optimum magnetic susceptibility.

In preparing the iron-carbon complex it is desirable to heat the slurry of ingredients above ambient temperature (21° C) to accelerate oxidation of ferrous hydroxide to iron oxide. It is preferable to heat the slurry to about 100° C. Heating of the slurry at about 100° C under air pressure is desirable since this further speeds the oxidation process. The time required to achieve formation of a magnetically susceptible iron-carbon complex of this invention will vary from up to about 120 minutes at ambient temperature to about 10 minutes at 100° C.

The magnetically susceptible iron-carbon complex used in the process of the present invention comprises from about 5 percent to about 35 percent by weight of iron oxide as $Fe_3O_4$ and from about 65 percent to about 95 percent of carbon. It is generally preferred to prepare an iron-carbon complex comprising at least about 10 percent by weight of iron oxide to permit ready removal of the complex when the complex is subjected to an applied magnetic force.

The term "magnetic susceptibility" as used herein in referring to the iron-carbon complex is defined as an increase in magnetic moment of the iron-carbon complex by the application of a magnetic field. If there is no increase in magnetic moment by the application of a magnetic field, or if the increase is so small as not to permit recovery of the iron-carbon complex through application of a magnetic field, the iron-carbon complex is not considered to be magnetically susceptible. The greater the magnetic susceptibility of the iron-carbon complex of this invention, the greater will be the attraction of the iron-carbon complex to a magnetic field of a given strength for separation of the complex. The lower the magnetic susceptibility of the iron-carbon complex, the greater is the strength of the magnetic field required to separate the complex from the liquid or continuous phase of the slurry in which it is prepared or to separate the complex from the system in which it is being used.

The process of this invention is further described with reference to the drawing in which an illustrative flow diagram is shown for treatment of a liquid stream containing organic contaminants (liquid stream). The liquid stream and complex are mixed in contacting devices such as a batch mixer, in-line continuous mixer, or the like. The quantity of complex employed will vary with the nature of the contaminant, contaminant level, and the reduction in contaminant level desired. The mixer employed must be capable of dispersing complex throughout the liquid. Dispersion of the complex throughout the liquid is important in order that the contaminants and the complex come into substantially complete contacting relationship whereby contaminant is adsorbed by the activated carbon portion of the complex. The time required to permit a dispersed complex to adsorb its capacity of contaminants will depend upon the contaminants present in the liquid stream and the temperature at which adsorption is taking place. The capacity of the complex will vary between different contaminants, said complex reaching an equilibrium condition on extended contact with contaminants, at which condition no further adsorptive capacity of the complex is realized. Thus, when practicing the process of this invention, simple experimental procedures can be practiced to determine the amount of complex that needs to be added to a fluid stream being treated in order to reduce the concentration of contaminants to an acceptable level. Similarly, the contact time required for the complex to reach its adsorptive capacity can be determined by contacting several samples of fluid to be treated with fresh complex and measuring the reduction in concentration of contaminants in the fluid. The rate of adsorption of contaminants will decrease with time. An equilibrium condition which exists between the contaminants in the fluid and the adsorbed contaminants on the complex can thus be approximated. Under general use condition this equilibrium will be achieved in about 5 minutes of contact time.

Following adsorption of the liquid contaminants from the liquid stream in the contactor, the resulting admixture comprising the complex and liquid is passed into a magnetic filter in which the admixture is subjected to an applied magnetic field. Optionally, the admixture can be subjected to settling to permit decantation of a substantial amount of purified liquid prior to magnetic filtration. The contaminant containing complex is attracted by said magnetic field in the magnetic filter and is continuously separated from the major portion of the liquid stream.

Suitable magnetic filters are known in the art. A typical filter suitable for use in the process of the present invention is a Frantz Ferro Filter, Model 42 with a 3⅞" × 6" cylindrical mesh core. This electromagnetic filter has about a 1,000 gauss field. At a flow rate of about 10 gal./min/sq. ft. of cross sectional area, such a filter is capable of removing all but about 50 ppm of powdered iron-carbon complex from an aqueous suspension containing 1,000 ppm of the complex.

A purified liquid stream and a slurry comprising complex and residual liquid stream are recovered. The purified liquid stream may be further purified if necessary by repeating the adsorption, filtration and separation steps employing the complex as heretofore described.

Following purification, the contaminant containing complex, which is generally in the form of a slurry with residual liquid, is transferred to a regeneration furnace in which the contaminant containing complex is heated to a temperature at which contaminants and residual liquid are vaporized from the complex. Optionally, the slurry may be conventionally filtered to remove a substantial amount of residual liquid prior to transferring the complex to the regeneration furnace.

The regeneration furnace can be a fluidized bed furnace operating at a temperature of from about 600° C to about 900° C. and at atmospheric pressure. The regenerative furnace is preferably operated in the substantial absence of oxygen. It is preferable to conduct regeneration in an inert atmosphere containing some steam. A particularly suitable inert gas is nitrogen. Heat can be provided by hot inert particles, such as sand, fed to the regeneration furnace. The residence time of a particle of complex in the regenerative furnace required to activate the complex, i.e., to strip off adsorbed contaminate, will range from several seconds at temperatures of about 900° F. to about 1 minute at temperatures of about 600° F. Residence time for activation of the complex will vary depending principally upon the contaminant being removed and regeneration temperature. The vaporized contaminants and activated complex are taken overhead from regeneration furnace and separated in a separator device such as a cyclone separator. Steam can be readily separated from the decomposition products if desired.

The regenerated complex may be recovered in the separator in the form of dry particles. Alternatively, regenerated complex may be quenched in the separator, as with water, and recovered in the form of a slurry. The recovered complex is conveyed back to the contactor for re-use.

While the process has been described employing a fluid bed furnace for regeneration of complex, it is to be understood that other types of furnaces such as tube furnaces as described in Example 1, can be readily employed.

The following examples illustrate various features of the present invention. Example 1 illustrates the adsorption and regeneration steps of the present invention. Example 2 demonstrates that the iron-carbon complex functions as well, or nearly as well, as virgin activated carbon for adsorbing contaminants from sewage. Example 3 illustrates the process of the present invention. In the Examples, parts and percentages are by weight unless otherwise specified.

EXAMPLE 1

Two parts of complex prepared in accordance with the disclosure of copending application Ser. No. 207,547 are admixed with 1,000 parts of aqueous filtered raw sewage (liquid stream containing contaminants) having a total oxygen demand (TOD) of 185 ppm. in a batch contactor. The complex comprises a heterogeneous cluster of powdered activated carbon having particles of iron oxide intermingling with and adhering to the powdered activated carbon, containing about 85 percent carbon and about 15 percent iron oxide as $Fe_3O_4$. The mixture is agitated sufficiently to completely disperse the complex throughout the liquid sewage. After 1 hour of mixing the mixture is allowed to settle for 1 hour and the majority of the purified liquid is decanted. The contaminant containing complex and residual liquid are filtered through 0.45 micron glass filter paper under vacuum and the complex is dried in an oven at 110° C. for 1 hour to remove substantially all of the water adhering to the complex.

The complex is then placed in a tube furnace for regeneration. Purified nitrogen saturated with water is first passed through the furnace to purge the furnace of air. The furnace is then heated to 700° C. The furnace is maintained at 700° C. for about 10 minutes. Gases resulting from vaporization of contaminants and residual liquid present on the complex are generated during heating and are removed from the furnace. When the rate of gas generation becomes constant, the heat to the furnace is turned off and the furnace is allowed to cool. Regenerated complex is recovered.

EXAMPLE II

Example 1 is repeated with the exception that in place of complex, virgin activated carbon is employed. Carbon adsorption isotherms are run on regenerated complex and on virgin activated carbon which are each dispersed for about one hour throughout equal amounts of aqueous filtered sewage having a total oxygen demand (TOD) of about 145 milligrams/liter. These isotherms show that the absorptive capacity of regenerated complex is substantially the same as that of virgin activated carbon.

EXAMPLE III

Two parts of magnetically susceptible iron-carbon complex comprising a multiplicity of heterogeneous clusters of powdered activated carbon having iron oxide intermingling with and adhering to the powdered activated carbon are admixed in a contactor with 1,000 parts of aqueous filtered raw sewage having a total oxygen demand (TOD) of 185 ppm. The complex contains about 85 percent carbon and about 15 percent iron oxide as $Fe_3O_4$. The mixture is agitated sufficiently to completely disperse the complex throughout the liquid sewage. The dispersion is maintained for about 5 minutes. The resulting admixture is passed through a cylindrical electromagnetic filter having a magnetic field of about 1,000 gauss. Substantially all of the complex is retained on the screens of the magnetic filter. When the screens of the filter are filled with complex, flow to the filter is stopped and the magnet removed. The complex is then washed from the filter with a small amount of water. This resulting aqueous slurry of complex is fed to a fluidized bed furnace operating at a temperature of 900° C. and at atmospheric pressure. Sand is employed as the heat transfer medium and the sand is fluidized using nitrogen gas. Heat is supplied to the sand particles by separate heat exchange means. Residence time of the complex in the fluidized bed furnace is about 20 seconds, contaminants are removed from the complex during this time and the complex and contaminants are taken overhead. The complex is separated from the vaporized contaminants in a cyclone separator. The regenerated complex is recovered with substantially no degradation or break-up and is conveyed back to the contactor for reuse as needed.

The process of this invention as heretofore described is particularly advantageous over prior art processes for removal of organic contaminants from liquids employing activated carbon, since flocculating agents and large settling tanks are not required. This process is also highly useful for purifying a gas stream containing organic contaminants.

What is claimed is:

1. A process for removal of organic contaminants from a liquid stream containing organic contaminants comprising:
   a. dispersing in said liquid stream, magnetically susceptible iron-carbon complex comprising a multiplicity of heterogeneous clusters of powdered activated carbon having particles of iron oxide comprising $Fe_3O_4$ intermingling with and adhering to the powdered activated carbon,
   b. maintaining said complex in a dispersed condition throughout said liquid stream until the adsorptive capacity of the complex is substantially reduced as a result of adsorption of contaminants from said liquid,
   c. passing the dispersion of step (b) through a magnetic filter in which said dispersion is subjected to a magnetic field whereby the dispersion is separated into (1) a liquid stream having a reduced concentration of contaminants and (2) a slurry comprising complex containing adsorbed contaminants and residual liquid,
   d. regenerating the separated complex of step (c) by heating said complex in an inert atmosphere at a temperature sufficient to desorb contaminants from the complex and to vaporize said contaminants, and maintaining said conditions until desorption is substantially complete, and
   e. recovering regenerated complex.

2. The process of claim 1 in which the contaminated complex of step (c) is regenerated by heating said complex at a temperature of from about 600° C to about 900° C in an atmosphere of nitrogen and steam.

* * * * *